Figure 1:
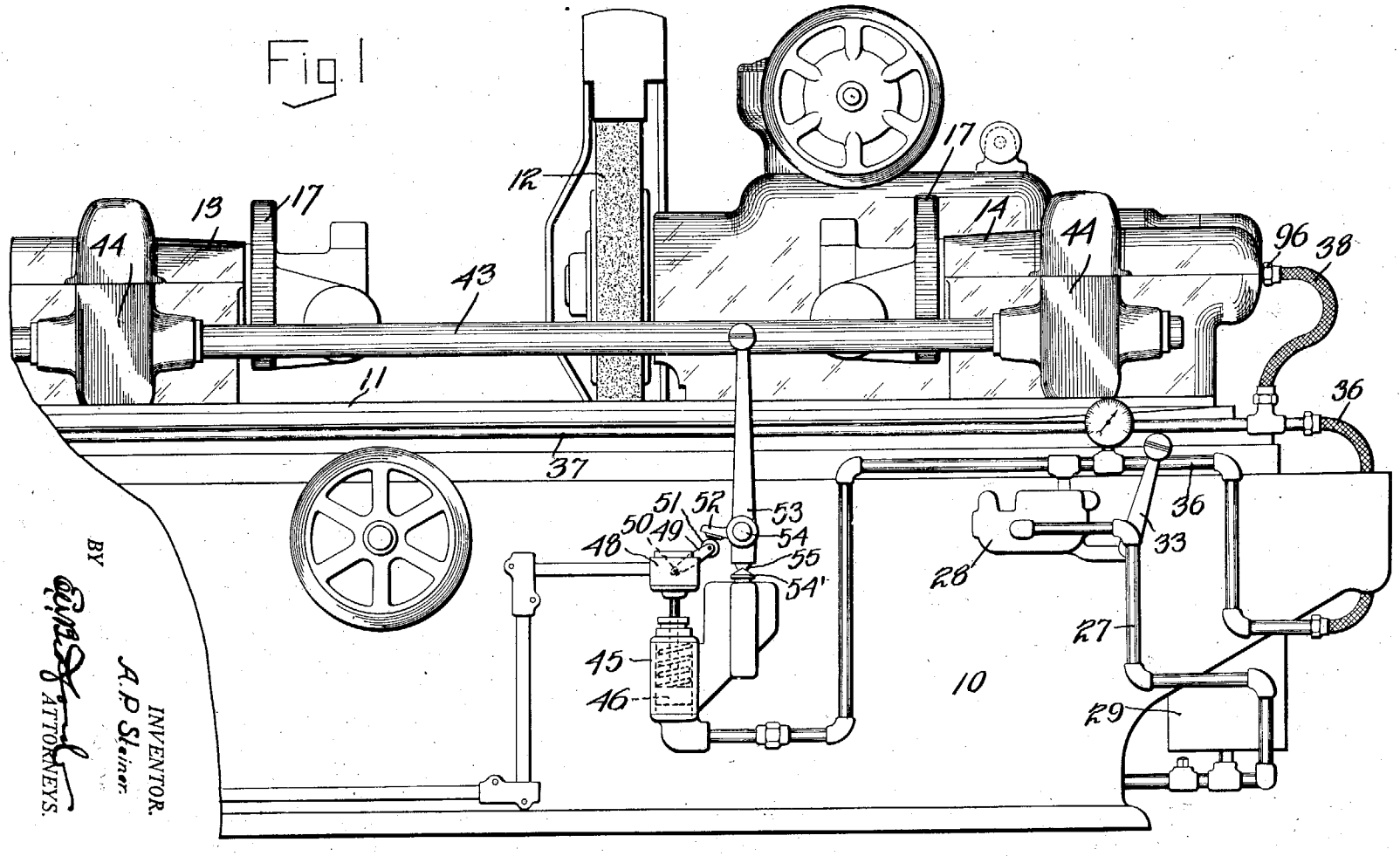

A. P. STEINER

Feb. 14, 1933. WORK CLAMPING FIXTURE FOR CRANK GRINDING MACHINES Re. 18,736

Original Filed Aug. 2, 1926 2 Sheets-Sheet 1

INVENTOR.
A. P. Steiner.
BY
ATTORNEYS.

A. P. STEINER
Feb. 14, 1933. WORK CLAMPING FIXTURE FOR CRANK GRINDING MACHINES Re. 18,736
Original Filed Aug. 2, 1926 2 Sheets-Sheet 2
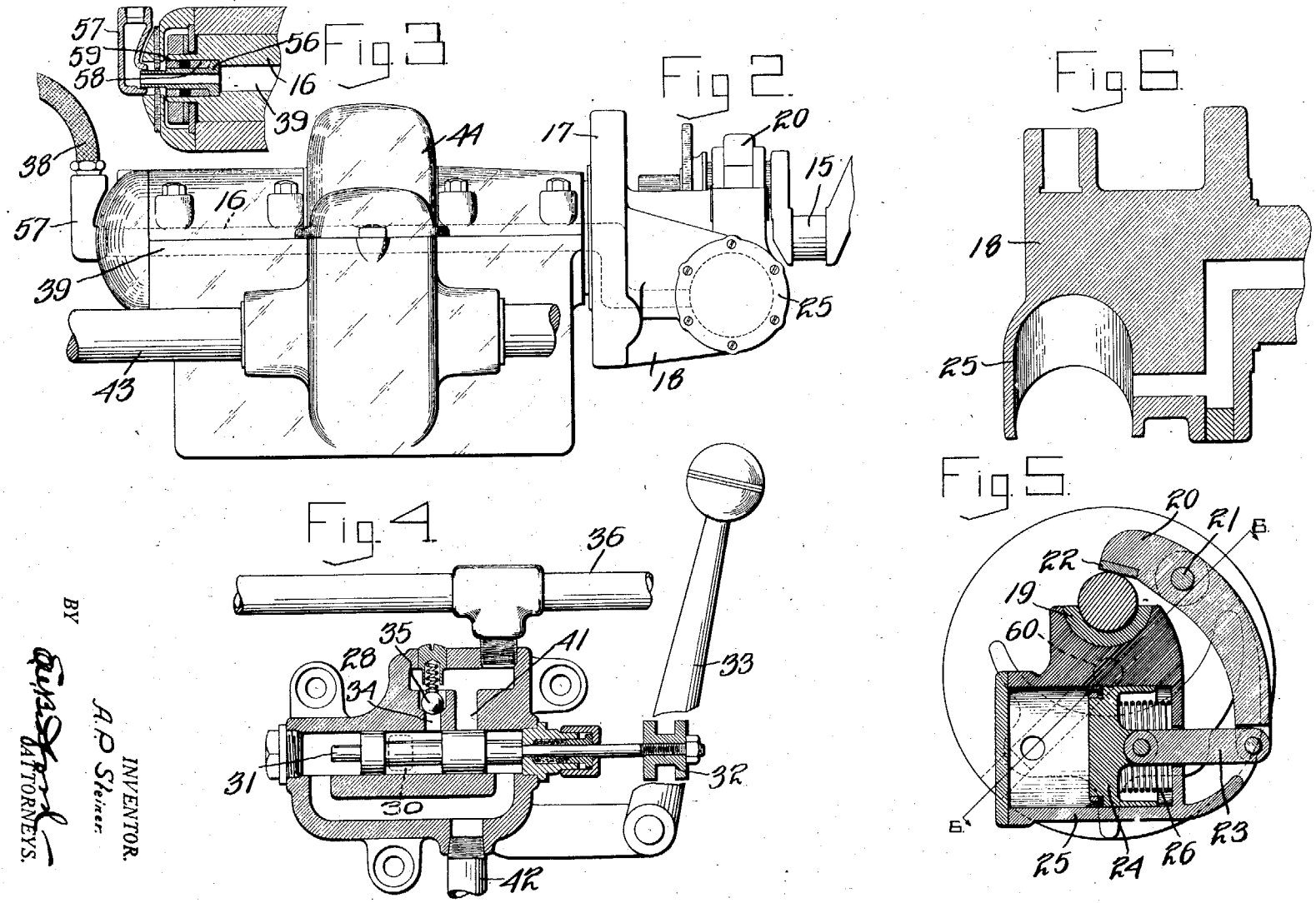
INVENTOR.
A. P. Steiner.
BY
ATTORNEYS.

Reissued Feb. 14, 1933 Re. 18,736

UNITED STATES PATENT OFFICE

AMOS P. STEINER, OF WAYNESBORO, PENNSYLVANIA, ASSIGNOR TO LANDIS TOOL COMPANY, OF WAYNESBORO, PENNSYLVANIA, A CORPORATION

WORK CLAMPING FIXTURE FOR CRANK GRINDING MACHINES

Original application filed August 2, 1926, Serial No. 126,583. Divided and application filed June 1, 1928. Serial No. 282,173. Original No. 1,755,937, dated April 22, 1930. Application for reissue filed February 18, 1932. Serial No. 594,651.

This invention relates to work clamping devices, and more particularly for clamping devices for use in connection with crank grinding machines and is a division of copending application resulting in Patent No. 1,876,750, granted July 28, 1931, for crank grinding machines.

It is an object of the invention to provide an improved hydraulically operated work clamping device.

A further object of the invention is to provide hydraulic means for simultaneously clamping the crank shaft in both crank heads of the grinding machine and resilient means for releasing the same, said first named means maintaining high pressure on the crank heads throughout the grinding operation.

A further object is to provide a work clamping fixture which will clamp the work eccentric with respect to its axis of rotation, whereby all the pins on a crank shaft may be ground without removing it from the clamping fixture.

Further objects and advantages will appear as the description proceeds.

Referring to the accompanying drawings which are made a part hereof and on which similar reference characters indicate similar parts, Figure 1 is a front elevation showing the general arrangement of the device, Figure 2, a front elevation of the left hand crank head showing a crank held by the hydraulic clamping device, Figure 3, a section through the spindle of the head, showing the revolving joint to admit fluid pressure from the stationary pipe through the revolving spindle, Figure 4, a sectional elevation of the operating and locking valve for the clamping fixture, Figure 5, a transverse sectional view of the work clamping fixture, and Figure 6, a longitudinal sectional view of the work clamping fixture taken on line 6—6 of Figure 5, In the drawings, reference character 10 indicates the body or frame of a crank grinding machine, which may be of conventional or desirable construction for supporting the various elements of the machine. A work carriage or table 11 is mounted on the base and is provided with traversing means for reciprocating the carriage to move the work lengthwise of the machine, thereby bringing different cranks at appropriate times into the field of action of the grinding wheel 12. The reciprocating carriage is provided with work clamping means, comprising a pair of crank heads 13 and 14 arranged to support means for gripping or clamping the ends of a crank shaft 15. Each of the crank heads is provided with a spindle 16 carrying at its inner end a crank shaft supporting fixture 17. The crank clamping means includes a projection 18 shaped at 19 to contact with the crank 15 throughout a portion of its circumference. A lever 20 is pivoted at 21 on the projection 18 and is provided at its free end with a wear plate 22 for engagement with the crank 15 to secure it in position. A link 23 is pivotally connected to the other end of the lever 20 and is also pivotally connected with a piston 24 in a cylinder 25, here shown as formed integrally with the projection 18. A spring 26 serves to move the piston in a direction to swing the lever for releasing the crank 15. Fluid under pressure is supplied to the cylinders 25 for moving the pistons in a direction to clamp the cranks in place by means of a pipe 27 communicating with a valve body 28, one of which is shown in detail in Fig. 4. Fluid under pressure from a tank 29 enters the valve body from the pipe 27 by way of a port 30. The valve body is provided with a balanced piston valve 31 mounted for sliding movement to control the operation of the clamping means and the course of the pressure fluid, said valve having a stem with a spool 32 thereon. A hand lever 33 serves to move the valve in one direction or the other. In the position shown in Fig. 4, fluid enters the valve chamber through the port 30 and passes through a port 34 and a check valve, comprising a spring pressed ball 35, into the pipe 36 which communicates with a pipe 37 extending approximately from end to end of the machine and provided with branches 38 communicating respectively with passages 39 extending through the spindles 16 to the cylinders 25 whereby the levers 20 are actuated to hold the crank in place. In the opposite extreme position of the lever 33 the piston valve 31 is positioned to cut off the flow of the pressure fluid through the valve body. At this time the exhaust port 41 is opened permitting the pressure fluid in the pipe 36 and passages 37 and 38 to escape through port 41 and pipe 42 back to the supply tank from which it is constantly drawn so long as the machine is in operation, by a pump, not shown, located in the base of the machine. The return of the fluid and the unclamping of the cranks is assisted by the action of the springs 26. The ball check valve 35 serves also as a safety device in this connection, in that it retains the pressure in the cylinder even though there should be a failure in the pump or in the supply line, and holds the cranks securely clamped until the lever 33 is moved to the left to such an extent as to reverse the valve 31. The spindles 16 which carry the crank clamping fixtures are rotated by gearing of any suitable type secured upon a shaft 43. The gears are encased in housings 44. The shaft 43 is driven from any suitable source, preferably by an electric motor, not shown. Any other suitable drive may be substituted for the electric drive.

I provide safety means whereby the shaft 43 cannot be rotated unless pressure fluid is turned on in the clamping devices. This includes a cylinder 45 having a piston. Hydraulic pressure in the pipe 36 acting under the piston 46 holds it in an elevated position. The switch mechanism located in 48 is such that it cannot be closed unless the piston is in an elevated position. The control switch 48 is provided with a switch lever 49 pivoted at 50. A roller 51 on the lever 49 is arranged for engagement with a switch actuating arm 52 on a bent hand lever 53 pivoted at 54. This lever operates the switch to start and stop the driving motor, thereby starting and stopping the rotation of the work. The hand lever 53 is normally held in the position shown in Fig. 1 by means of a spring pressed V-shaped detent 54′, engaging a notch in the W-shaped lug 55 projecting downwardly from the lever; the four inclined faces on the lug 55 coact with the two faces on the detent to lock the lever in any one of three positions, that is, the central position where both the work and the traverse are stopped, a position to the left of that shown in Fig. 1, wherein the work is rotated while the carriage stands still, and a position to the right of that shown, wherein the carriage is traversed while the work stands still.

It is necessary to make provision at the juncture of the stationary end of the branch pipe 38 and the corresponding end of the adjacent rotative spindle 16 to prevent loss of pressure fluid. For this purpose there is provided a hardened stationary sleeve 56 secured in any convenient manner to an elbow 57 forming a part of the branch 38. The sleeve 56 has a spherical seat held against the corresponding seat in a bushing 58 revolving with the spindle 16. The seats are forced together by pressure of the fluid so as to act effectively for preventing a leak. A packing gland at 59 serves as additional retaining means.

The operation of the device is as follows:

In the operation of the device, it may be assumed that the work carriage is at one end of its traverse, the crank-clamping chucks are open and the wheel carriage is in retracted position. A crank shaft 15 is now placed in the clamping position relatively to the chucks and the lever 33 is moved from inoperative position into operative position so that fluid under pressure in the tank 29 may pass through pipe 27, port 30, past ball check valve 35 into the pipe 36, then through pipe 37, the spindles 16 to the cylinders 25 to actuate the pistons 24 and cause the crank shafts to be firmly clamped in both chucks.

As shown in Fig. 4, the work 15 is clamped between the shoe 22 and the member 19 at a point eccentric with respect to the axis of rotation of the spindle 16, such axis being indicated at 60. This axis of rotation will represent the position of the pin on the crank shaft when in position to be ground. When all the pins in this plane are ground the crank may be rotated to bring a new set of pins in line with the axis of rotation of the spindle 16, in which position they may be ground. It will readily be seen therefore that all the pins on a given crank shaft may be ground without removing the shaft or changing the setup of the machine, it only being necessary to rotate the crank shaft to bring the respective set of pins in axial alignment with the center of rotation of the spindle 16.

It will be obvious to those skilled in the art that various changes may be made in my device without departing from the spirit of the invention and I, therefore, do not limit myself to what is shown in the drawings and described in the specification, but only as set forth in the appended claims.

Having thus fully described my said invention, what I claim as new and desire to secure by Letters Patent, is:

1. In a crank grinding machine having a grinding wheel, opposed crank heads, a lever on each head having a gripping jaw, a cylinder on each head, a piston in the cylinder acting on the corresponding lever, and means for applying pressure equally and simultaneously to said pistons, substantially as set forth.

2. In a crank grinding machine having a grinding wheel, a work carriage, opposed crank heads on the carriage, rotary spindles on said crank heads, crank clamping fixtures on said shafts, a movable jaw in each fixture, a piston connected thereto, a passage for pressure fluid extending axially of each spindle into operative relation with the corresponding piston, and common means for supplying fluid under pressure to said passages, substantially as set forth.

3. In a crank grinding machine having a grinding wheel, a work carriage, opposed crank heads on the carriage, rotary spindles on said crank heads, crank clamping fixtures on said spindles, a movable jaw in each fixture, a piston connected thereto, a passage for pressure fluid extending axially of each spindle into operative relation with the corresponding piston, a common supply pipe communicating with each of said passages, and a fluid-tight joint between the pipe and each of said spindles, substantially as set forth.

4. In a crank grinding machine, work clamping means comprising jaws pivoted to grip the work eccentric with respect to its axis of rotation, and fluid operated pistons revolvable about said axis for actuating said jaws, substantially as set forth.

5. In a crank grinding machine having a grinding wheel, a work carriage, opposed crank heads on the carriage, rotary spindles on said crank heads, crank clamping fixtures comprising pivoted levers with work engaging jaws thereon, and hydraulic means for operating said levers, substantially as set forth.

6. In a crank grinding machine having a grinding wheel and opposed crank heads, work supporting and driving means comprising a lever extending at right angles to the axis of rotation of the work and having a work gripping jaw, a cylinder, a piston therein, the piston in the cylinder being connected to the lever, and means for applying pressure to said pistons, substantially as set forth.

7. In a grinding machine, a pair of opposed heads, means for holding work between said heads comprising a lever on each head, a jaw on said lever, a cylinder, a piston in said cylinder, operative connection between said piston and said lever, and means for applying hydraulic pressure to said piston to operate it and the said lever, substantially as set forth.

8. In a crank grinding machine, work clamping and supporting means comprising jaws pivoted to grip the work eccentric with respect to its axis of rotation, one of said jaws being mounted on a lever extending at right angles to the axis of rotation of the work and fluid operated pistons for actuating said jaws, substantially as set forth.

9. In a crank grinding machine having a grinding wheel, a work carriage, opposed crank heads on the carriage and rotary spindles on said crank heads, crank clamping means comprising pivoted levers having work engaging jaws mounted therein, hydraulic means for moving said jaws to crank engaging position, and resilient means for moving said jaws in a direction to release the work, substantially as set forth.

10. In a crank grinding machine having a grinding wheel, a work carriage, opposed crank heads on the carriage, spindles rotatably mounted on said crank heads, crank clamping fixtures comprising pivoted levers having work engaging jaws therein, hydraulic means for operating said levers in one direction, and resilient means for moving said levers in the other direction, substantially as set forth.

11. In a crank grinding machine, a work clamping fixture comprising a support having levers mounted thereon said levers having work gripping jaws attached thereto, a cylinder having a piston therein, said piston being operably connected to one of said levers, pressure fluid means for operating said piston in one direction, resilient means for operating it in the other direction, and a pressure fluid conduit extending through said support for supplying pressure fluid to the said cylinder, substantially as set forth.

In witness whereof, I, have hereunto set my hand at Waynesboro, Pennsylvania, this 29th day of January, A. D. one thousand nine hundred and thirty-two.

AMOS P. STEINER.